(12) United States Patent
Choi et al.

(10) Patent No.: US 8,792,760 B2
(45) Date of Patent: Jul. 29, 2014

(54) OPTICAL ELECTRICAL HYBRID CABLE

(75) Inventors: Han-Dong Choi, Gumi-si (KR); Ho-Soon Lee, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 106 days.

(21) Appl. No.: 13/462,054

(22) Filed: May 2, 2012

(65) Prior Publication Data

US 2012/0281953 A1 Nov. 8, 2012

(30) Foreign Application Priority Data

May 3, 2011 (KR) .................. 10-2011-0041847

(51) Int. Cl.
*H01B 11/22* (2006.01)
*G02B 6/42* (2006.01)

(52) U.S. Cl.
USPC ........................................ 385/101

(58) Field of Classification Search
None
See application file for complete search history.

(56) References Cited

U.S. PATENT DOCUMENTS

| | | | |
|---|---|---|---|
| 5,325,457 | A | 6/1994 | Bottoms, Jr. et al. |
| 5,677,974 | A | 10/1997 | Elms et al. |
| 6,195,487 | B1 | 2/2001 | Anderson et al. |
| 6,236,789 | B1 | 5/2001 | Fitz |
| 2006/0045442 | A1 | 3/2006 | Varkey et al. |
| 2011/0280527 | A1 | 11/2011 | Tamura |

FOREIGN PATENT DOCUMENTS

| | | |
|---|---|---|
| CN | 1152784 A | 6/1997 |
| CN | 201011626 Y | 1/2008 |
| CN | 101887782 A | 11/2010 |
| DE | 295 20 915 U1 | 5/1996 |
| EP | 0 005 029 A1 | 10/1979 |
| JP | 5-298943 A | 11/1993 |
| KR | 10-2011-0011320 A | 2/2011 |
| KR | 10-2011-0126051 A | 11/2011 |

*Primary Examiner* — Jerry Rahll
(74) *Attorney, Agent, or Firm* — Jefferson IP Law, LLP

(57) ABSTRACT

An optical electrical hybrid cable for transmitting an optical signal and an electrical signal simultaneously is provided. The optical electrical hybrid cable includes a fiber-optic cable disposed in the center of the optical electrical hybrid cable, and including a plurality of tubes each of which comprises a plurality of optical fibers operatively mounted in an inner space thereof, and a first binder disposed around the plurality of tubes, a plurality of power cables disposed around the fiber-optic cable, each of the power cables comprising a plurality of conducting wires, and a second binder disposed around the plurality of power cables.

19 Claims, 3 Drawing Sheets

OPTICAL ELECTRICAL HYBRID CABLE

PRIORITY

This application claims the benefit under 35 U.S.C. §119 (a) of a Korean patent application filed in the Korean Intellectual Property Office on May 3, 2011 and assigned Serial No. 10-2011-0041847, the entire disclosure of which is hereby incorporated by reference.

BACKGROUND OF THE INVENTION

1. Field of the Invention

The present invention relates generally to an optical cable. More particularly, the present invention relates to an optical electrical hybrid cable capable of simultaneously transmitting optical signals and electrical signals.

2. Description of the Related Art

Due to the industrial development, the amount of information required by users has increased exponentially. Such an exponential increase in the amount of information to be communicated over communication networks has led to the advent of the Fiber-To-The-Home (FTTH) era in which optical cables will reach inside buildings to increase throughput of the information dramatically.

Conventionally, fiber-optic cables and power cables are installed separately, thereby causing the need for wide cable installation spaces and the delay in installation work. Such installation methods according to the related art have increased costs associated with labor, materials, and space.

To address these and other problems and shortcomings, an improved configuration has been proposed in which one cable includes a central tensile wire, power cables disposed around the central tensile wire, and fiber-optic tubes are inserted into every valley between the power cables.

Disadvantageously, however, for a cable with such a configuration, it is difficult to separate fiber-optic units and power cables, add optical fibers, and protect optical fibers from external forces such as external tension and external shocks that may be exerted on the cable.

Further, in a cable with such a configuration, in order to insert fiber-optic tubes into a valley between power cables, the power cables must be considerably large in diameter, thereby causing restrictions on the reduction in diameter of the cable.

Therefore, a need exists for a system and method for performing a self diagnosis of a device without the inconvenience caused when manually selecting a self diagnosis item from a computer or a user interface.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of exemplary embodiments of the present invention are to address at least the above-mentioned problems and/or disadvantages and to provide at least the advantages described below. Accordingly, an aspect of exemplary embodiments of the present invention is to provide an optical electrical hybrid cable configured to simultaneously transmit optical signals and electrical signals with one cable efficiently and stably. Benefits of such an aspect of exemplary embodiments of the present invention may include eliminating the need to install fiber-optic cables and power cables separately, facilitating addition of fiber-optic units, reducing the external diameter of the cable, and protecting optical fibers effectively from the force exerted from the outside such as external tension and external shocks.

In accordance with an aspect of the present invention, an optical electrical hybrid cable for transmitting an optical signal and an electrical signal simultaneously is provided. The optical electrical hybrid cable includes a fiber-optic cable disposed in the center of the optical electrical hybrid cable, and including a plurality of tubes each of which comprises a plurality of optical fibers operatively mounted in an inner space thereof, and a first binder disposed around the plurality of tubes, a plurality of power cables disposed around the fiber-optic cable, each of the power cables comprising a plurality of conducting wires, and a second binder disposed around the plurality of power cables.

In accordance with another aspect of the present invention, a method of manufacturing an optical electrical hybrid cable for transmitting an optical signal and an electrical signal simultaneously is provided. The method includes forming a fiber-optic cable that comprises a plurality of tubes, each of which comprises a plurality of optical fibers operatively mounted in an inner space thereof, and a first binder disposed around the plurality of tubes, positioning a plurality of power cables so as to be disposed around the fiber-optic cable, each of the power cables comprising a plurality of conducting wires, and forming a second binder around the plurality of power cables.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In particular, it should be noted that the ordinal numbers such as 'first' and 'second' are used to merely distinguish components having the same name, and these ordinal numbers may be arbitrarily used regardless of their order.

Figure 1:
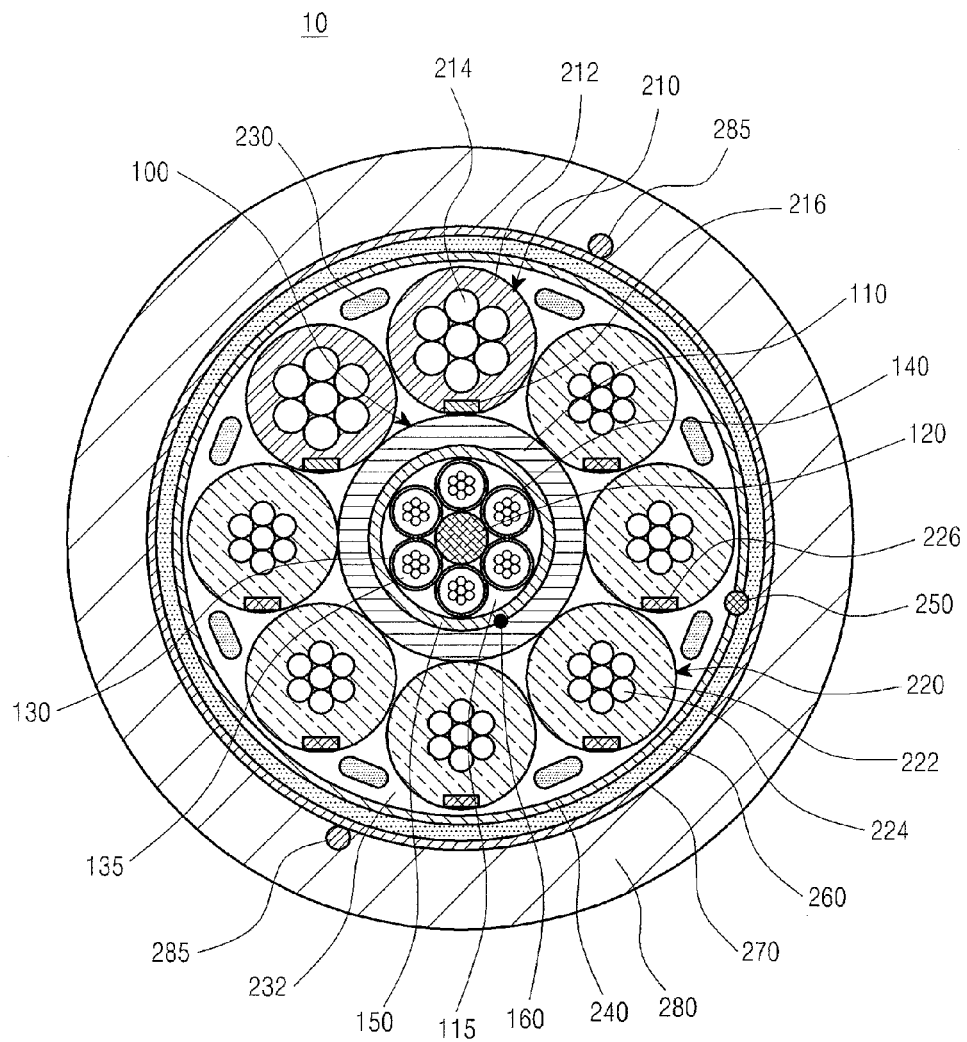
FIG. 1 illustrates an optical electrical hybrid cable according to an exemplary embodiment of the present invention.

FIG. 1 illustrates an optical electrical hybrid cable according to an exemplary embodiment of the present invention.

Referring to FIG. 1, the optical electrical hybrid cable 10 includes a fiber-optic cable 100, a plurality of power cables 210 and 220, a second binder 240, a plurality of interposed cores 230, a ground member 250, an electromagnetic shielding member 260, a third binder 270, second rip cords 285, and a second coating 280.

The fiber-optic cable 100 is located in the center of the optical electrical hybrid cable 10, and the fiber-optic cable 100 includes a central tensile member 120, a plurality of tubes 130, a first binder 150, a first rip cord 160, and a first coating 110.

The central tensile member 120 is disposed in the center of the fiber-optic cable 100. The central tensile member 120 provides tensile strength to the fiber-optic cable 100. For example, the central tensile member 120 may withstand high compression and tensile loads. In addition, the central tensile member 120 may be flame-retardant. The central tensile member 120 may include only a core made of a conductive material such as steel or a nonconductive material such as Fiberglass Reinforced Plastic (FRP), or may include the core and a coating layer stacked on the outer surface of the core. The coating layer is made of a nonconductive material, and may be made of a plastic material such as, for example, Polyethylene (PE) and Polyvinyl Chloride (PVC).

The plurality of tubes 130 are disposed around the central tensile member 120. As an example, the disposition of the plurality of tubes 130 may be a linear disposition, a spiral disposition, and/or an S-Z disposition. Preferably, the plurality of tubes 130 may be wound directly on (i.e., in contact with) the outer circumference of the central tensile member 120 so as to surround the central tensile member 120. Because such an S-Z disposition is described in detail in U.S. Pat. No. 4,828,352, entitled "S-Z Stranded Optical Cable", invented by and granted to Heinrich A. Kraft, a detailed description thereof will be omitted.

The tubes 130 have a hollow cylinder geometry with a hole 135 in the center thereof, and a plurality of colored optical fibers 140 are mounted in the hole 135 in the tubes 130. The tubes 130 may be made of a nonconductive plastic material. For example, the tubes 130 may be made of a material such as Polyvinyl Chloride (PVC), Polybutylene Terephthalate (PBT), Polypropylene (PP), Polyethylene (PE) and Polyurethane (PU). As another example, the tubes 130 may be made of a Low Smoke Zero Halogen (LSZH) material having flame retardant features. Preferably, the colored optical fibers 140 may have a diameter of 0.9 mm or below (e.g., 0.6 mm) According to an exemplary embodiment of the present invention, the colored optical fibers 140 may have a diameter between 0.6 mm and 0.9 mm.

A waterproofing or absorbent member such as an absorbent powder, a water swellable yarn, an absorbent jelly, and/or the like may be filled in the hole 135 in the tubes 130. The absorbent member absorbs the moisture that permeates into the tubes 130.

According to exemplary embodiments of the present invention, rather than filling the hole 135 in the tubes 130 with the absorbent member, a reinforcement member may be filled in the hole 135 in the tubes 130. For example, the reinforcement member may be a reinforcement yarn such as aramid yarn and glass yarn. In addition, the reinforcement yarn may be coated with super absorbent powder, and a combination of water swellable yarn and aramid yarn may be used as the reinforcement member.

Although the colored optical fibers 140 are mounted in the tubes 130 to facilitate their identification in this exemplary embodiment of the present invention by way of example, any type of optical transmission media which is transmission media for optical signals may be mounted in the tubes 130. Examples of such optical transmission media may include the common optical fibers that include only a core and a clad, optical fibers that include a resin layer on the outer side thereof, tight buffer optical fibers, ribbon optical fibers, and the like. In other words, the optical transmission media may include bare optical fibers made of a high-refractive index core and a low-refractive index clad, bare optical fibers coated with resin (e.g., this type is usually called 'optical fibers'), optical fibers extruded and coated with plastic (e.g., this type is called 'buffer optical fibers'), and a plurality of optical fibers coated with resin and integrated (e.g., this type is called 'ribbon optical fibers'). The tight buffer optical fibers, which are also referred to as tight coated optical fibers, include a core which is a transmission medium for optical signals and which has a relatively high refractive index, a clad which serves to confine the optical signals in the core and which has a relatively low refractive index, and a tight coating layer for protecting the optical fibers made of the core and the clad. A material of the tight coating layer may include a polymer compound such as PVC, Hytrel, nylon, PE, polyester, and polyolefin.

The first binder 150 is disposed around the tubes 130 so as to directly wrap the tubes 130. According to exemplary embodiments of the present invention the first binder 150 serves to fix the tubes 130 to the circumference of the central tensile member 120. The first binder 150 may include a tape made of a plastic material (e.g., polyester). As another example, the first binder 150 may include a waterproofing tape for preventing moisture from permeating thereinto.

The first coating 110 is disposed as the outermost region or layer of the fiber-optic cable 100. For example, the first coating 110 is configured so as to operatively surround the first binder 150. Preferably, the first coating 110 is stacked directly on (i.e., in contact with) the outer circumference of the first binder 150 so as to wrap the first binder 150. The first coating 110 serves to protect the inside of the fiber-optic cable 100 from the outside thereof. The first coating 110 is directly extruded on the outer circumference of the first binder 150, and the first coating 110 may be made of a plastic material such as, for example, PVC, PE, polyolefin, and Ethylene Vinyl Acetate (EVA) copolymer. Preferably, the first coating 110 may have an oxygen index of 28% or more to ensure sufficient flame retardancy. The oxygen index, a dimensionless value of limiting oxygen concentration where flammable solid may ignite, may also be referred to as Limit Oxygen Index (LOI). As an example, the first coating 110 may contain halogen compound, aluminum hydroxide, or magnesium hydroxide to increase the oxygen index. As another example, the first coating 110 may be made of an LSZH material having flame retardant features.

An absorbent member such as waterproofing yarn, or a reinforcement member such as aramid yarn may be filled in an empty space 115 within the first coating 110.

The first rip cord 160 is located between the first binder 150 and the first coating 110, and is disposed adjacent to the inner circumference of the first coating 110 to facilitate stripping of the first coating 110.

According to exemplary embodiments of the present invention, the plurality of power cables 210 and 220 are disposed around the fiber-optic cable 100. As an example, the disposition may be a linear disposition, a spiral disposition, and an S-Z disposition. Preferably, the plurality of power cables 210 and 220 may be wound directly on (i.e., in contact with) the outer circumference of the fiber-optic cable 100 so as to surround the fiber-optic cable 100. The plurality of power cables 210 and 220 include a plurality of conducting wires 214 and 224 which are transmission media for electrical signals or ground wires, and coatings 212 and 222 stacked directly on (i.e., in contact with) the outer circumference of the conducting wires 214 and 224 so as to wrap the conducting wires 214 and 224 so as to isolate the conducting wires 214 and 224 from the outside. The conducting wires 214 and 224 may include a common copper wire. According to exemplary embodiments of the present invention the coatings 212 and 222 are directly extruded on the outer circumference of the conducting wires 214 and 224. The coatings 212 and 222 may be made of a plastic material such as, for example, PE, polyolefin, EVA, and PVC. In addition, the coatings 212 and 222 may be made of a material having flame retardant features. For example, the coatings 212 and 222 may be made of Cross-Linked Polyolefin (XLPO) and retardant PE, or may have characteristics of LSZH. For example, the power cables 210 and 220 may include seven (or nineteen) helically twisted cooper wires.

The plurality of power cables 210 and 220 may be divided into several types depending on the total diameter of their built-in conducting wires. According to such an exemplary embodiment of the present invention, the plurality of power cables 210 and 220 include two first power cables 210 including built-in conducting wires that are relatively large in total diameter, and six second power cables 220 including built-in conducting wires that are relatively small in total diameter. For example, each of the conducting wires may be made of a copper material. As example, each of the conducting wires may have a cross-sectional area of 1 mm$^2$.

The power cables 210 and 220 may have color strips 216 and 226, respectively, all or some of which are colored in specific color, or exposed to the outer surface thereof to indicate the total diameter of the built-in conducting wires, the diameter, or the number of individual conducting wires, etc.

The second binder 240 is disposed around the power cables 210 and 220 so as to directly wrap the power cables 210 and 220. The second binder 240 serves to fix the power cables 210 and 220 to the circumference of the fiber-optic cable 100. The second binder 240 may include a tape made of a plastic material (e.g., polyester). As another example, the second binder 240 may include a waterproofing tape for preventing moisture from permeating thereinto.

The plurality of interposed cores 230 are disposed in an outer valley formed between two adjacent power cables 210 and 220 so that the optical electrical hybrid cable 10 may maintain its original shape. For example, an outer valley (e.g., close to the outer circumference of the optical electrical hybrid cable 10) and an inner valley (e.g., close to the center of the optical electrical hybrid cable 10) are formed between two adjacent first power cables 210, and one interposed core 230 is disposed in the outer valley between the first power cables 210. As an example, the interposed core 230 may be made of one or more yarns. A material of the interposed core 230 may include plastic such as flame retardant or non-retardant Polypropylene.

According to exemplary embodiments of the present invention, the electromagnetic shielding member 260 is disposed around the second binder 240. The electromagnetic shield member 260 serves to block electromagnetic waves. In other words, the electromagnetic shielding member 260 completely wraps around the circumference of the second binder 240, and prevents electromagnetic waves incident on its surface from permeating (e.g., or leaking) into the inside (e.g., or outside) thereof passing through the electromagnetic shielding member 260. The electromagnetic waves blocked by the electromagnetic shielding member 260 and flowing on the surface thereof are passed to the external ground through the ground member 250.

As an example, the electromagnetic shielding member 260 may include an aluminum mylar tape. Although the second binder 240 and the electromagnetic shielding member 260 are used together according to some exemplary embodiments of the present invention, by way of example, the electromagnetic shielding member 260 may be configured to directly wrap around the circumference of the power cables 210 and 220 spirally with the second binder 240 removed, such that the electromagnetic shielding member 260 serves as the second binder 240 as well.

The ground member 250 is disposed between the second binder 240 and the electromagnetic shielding member 260 so as to be in contact with the electromagnetic shielding member 260. The ground member 250 includes a plurality of conducting wires. As an example, the conducting wires may include a common copper wire. For example, the ground member 250 may include a drain wire in which seven or nineteen copper wires, each having a cross-sectional area of 1 mm$^2$, are helically twisted.

The third binder 270 is disposed around the electromagnetic shielding member 260 so as to directly wrap the electromagnetic shielding member 260. As an example, the third binder 270 serves to fix the electromagnetic shielding member 260 to the circumference of the second binder 240. The third binder 270 may include a tape made of a plastic material (e.g., polyester). As another example, the third binder may include a waterproofing tape for preventing moisture from permeating thereinto.

The second coating 280 is disposed in the outermost of the optical electrical hybrid cable 10. For example, the second coating 280 surrounds the third binder 270. Preferably, the second coating 280 may be stacked directly on (i.e., in contact with) the outer circumference of the third binder 270 so as to wrap the third binder 270. The second coating 280 serves to protect the inside of the optical electrical hybrid cable 10 from the outside thereof. The second coating 280 is directly extruded on the outer circumference of the third binder 270. For example, the second coating 280 may be made of a plastic material such as, for example, PVC, PE, polyolefin, EVA, and the like. Preferably, the second coating 280 may have an oxygen index of 28% or more to ensure sufficient flame retardancy. As an example, the second coating 280 may contain halogen compound, aluminum hydroxide, or magnesium hydroxide to increase the oxygen index. The second coating 280 may be made of an LSZH material having flame retardant characteristics.

An absorbent member may be filled in an empty space 232 within the second coating 280 (or second binder 240). As an example, such an absorbent member may be waterproofing yarn, or a reinforcement member such as aramid yarn.

According to exemplary embodiments of the present invention, the second rip cords 285 are located between the third binder 270 and the second coating 280. The second rip cords 285 are disposed adjacent to the inner circumference of the second coating 280 to facilitate stripping of the second coating 280.

Figure 2:
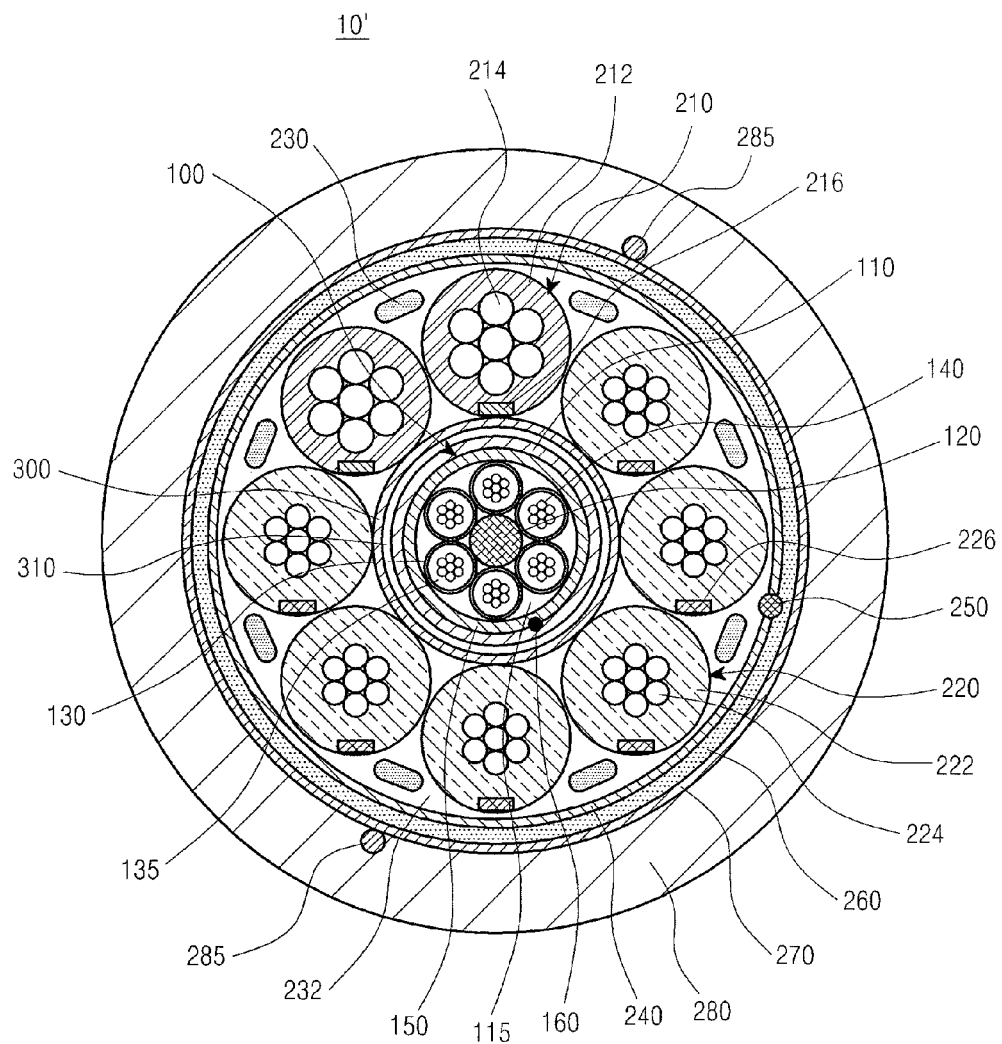
FIG. 2 illustrates an optical electrical hybrid cable according to an exemplary embodiment of the present invention.

FIG. 2 illustrates an optical electrical hybrid cable according to an exemplary embodiment of the present invention.

Referring to FIG. 2, the optical electrical hybrid cable 10' is similar in structure to the optical electrical hybrid cable 10 illustrated in FIG. 1. As an example, the optical electrical hybrid cable 10' is different from the optical electrical hybrid cable 10 in that the optical electrical hybrid cable 10' further includes a mini duct 300 surrounding the fiber-optic cable 100, in the center thereof. Therefore, the same components are represented by the same reference numerals, and duplicate descriptions will be omitted for simplicity.

The mini duct 300 is located substantially in the center of the optical electrical hybrid cable 10'. The mini duct 300 has a hollow cylinder geometry with a hole 310 in the center thereof, and the fiber-optic cable 100 is mounted in the hole 310 in the mini duct 300. As an example, the mini duct 300 may be made of a nonconductive plastic material. For example, the mini duct 300 may be made of a material such as PVC, PBT, PP, PE, PU, and the like. As another example, the mini duct 300 may be made of an LSZH material having flame retardant characteristics.

According to exemplary embodiments of the present invention, the hole 310 in the mini duct 300 is greater in diameter than the fiber-optic cable 100. For example, according to exemplary embodiments of the present invention, the hole 310 has an extra space, so other fiber-optic cables may be further mounted in the mini duct 300 later, if necessary. Preferably, for example, a cross-sectional area occupied by the fiber-optic cable 100 corresponds to 85% or less of the cross-sectional area occupied by the hole 310 in the mini duct 300.

Figure 3:
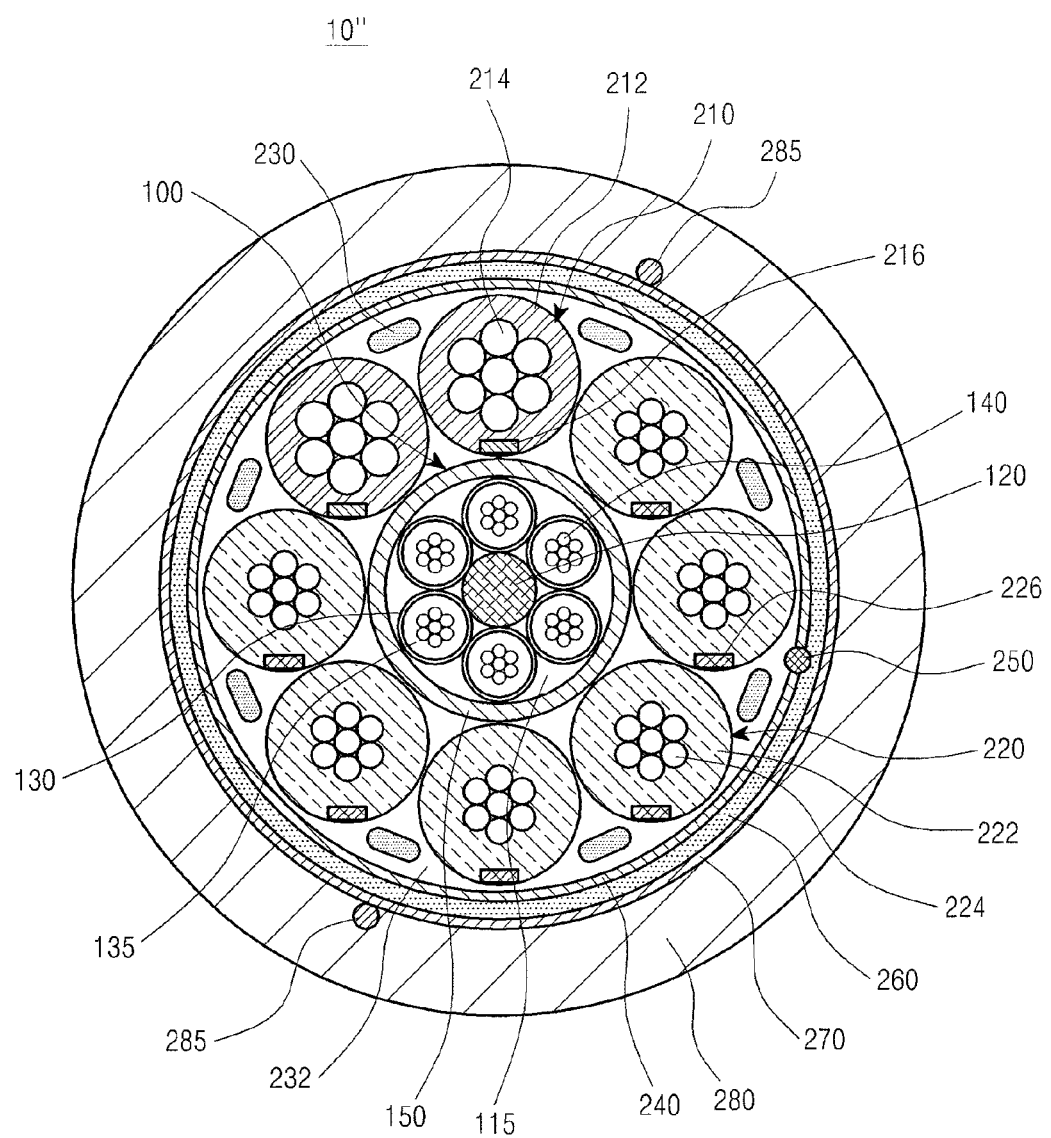
FIG. 3 illustrates an optical electrical hybrid cable according to an exemplary embodiment of the present invention.

FIG. 3 illustrates an optical electrical hybrid cable according to an exemplary embodiment of the present invention.

Referring to FIG. 3, the optical electrical hybrid cable 10" is similar in structure to the optical electrical hybrid cable 10 illustrated in FIG. 1. As an example, the optical electrical hybrid cable 10" is different from the optical electrical hybrid cable 10 in that the first rip cord 160 and the first coating 110 are removed from the fiber-optic cable 100 illustrated in FIG. 1. In other words, the optical electrical hybrid cable 10" does not include the first rip cord 160 and the first coating 110 which are included in the optical electrical hybrid cable 10 illustrated in FIG. 1. Therefore, the same components are represented by the same reference numerals, and duplicate descriptions will be omitted for simplicity.

As illustrated in FIG. 3, a fiber-optic cable 100' is located in the center of the optical electrical hybrid cable 10". The fiber-optic cable 100' includes a central tensile member 120, a plurality of tubes 130 and a first binder 150. According to exemplary embodiments of the present invention, the fiber-optic cable 100' does not include a coating and/or a rip cord.

A plurality of power cables 210 and 220 are disposed around the fiber-optic cable 100'. As an example, the disposition of the plurality of tubes 130 may be a linear disposition, a spiral disposition, and/or an S-Z disposition. Preferably, the plurality of power cables 210 and 220 may be wound directly on (i.e., in contact with) the outer circumference of the first binder 150 so as to surround the fiber-optic cable 100'.

As is apparent from the foregoing description, an optical electrical hybrid cable proposed by the present invention includes a fiber-optic cable situated in the center thereof and has a plurality of power cables disposed around the fiber-optic cable, making it possible to simultaneously transmit optical signals and electrical signals with one cable efficiently and stably. Benefits of such a fiber-optic cable may include eliminating the need to install fiber-optic cables and power cables separately, facilitating addition of fiber-optic units, reducing the external diameter of the cable, and protecting optical fibers effectively from the external forces such as forces exerted from the outside including external tension and external shocks.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An optical electrical hybrid cable for transmitting an optical signal and an electrical signal simultaneously, the optical electrical hybrid cable comprising:
    a fiber-optic cable disposed in the center of the optical electrical hybrid cable, and including a plurality of tubes each of which comprises a plurality of optical fibers operatively mounted in an inner space thereof, and a first binder disposed around the plurality of tubes;
    a plurality of power cables disposed around the fiber-optic cable, each of the power cables comprising a plurality of conducting wires;
    a second binder disposed around the plurality of power cables; and
    a mini duct comprising an inner space in which the fiber-optic cable is operatively mounted,
    wherein the mini duct is disposed substantially in the center of the optical electrical hybrid cable.

2. The optical electrical hybrid cable of claim 1, wherein the plurality of power cables include at least two types of power cables, and
    wherein each of the at least two types of power cables comprise built-in conducting wires that are different in diameter from the built-in conducting wires of the other types of power cables.

3. The optical electrical hybrid cable of claim 1, further comprising a coating disposed around the second binder and disposed in the outermost of the optical electrical hybrid cable.

4. The optical electrical hybrid cable of claim 1, further comprising a plurality of interposed cores each of which is disposed between at least one of the plurality of power cables and the second binder so that the optical electrical hybrid cable may maintain an original shape thereof.

5. The optical electrical hybrid cable of claim 3, further comprising an electromagnetic shielding member disposed between the plurality of power cables and the coating, for electromagnetic shielding.

6. The optical electrical hybrid cable of claim 5, further comprising a ground member disposed between the plurality of power cables and the coating, so as to be in contact with the electromagnetic shielding member.

7. The optical electrical hybrid cable of claim 1, wherein the power cable comprises:
    the at least one conducting wire; and
    a nonconductive coating disposed around the conducting wire.

8. A method of manufacturing an optical electrical hybrid cable for transmitting an optical signal and an electrical signal simultaneously, the method comprising:
- forming a fiber-optic cable that comprises a plurality of tubes, each of which comprises a plurality of optical fibers operatively mounted in an inner space thereof, and a first binder disposed around the plurality of tubes;
- positioning a plurality of power cables so as to be disposed around the fiber-optic cable, each of the power cables comprising a plurality of conducting wires;
- forming a second binder around the plurality of power cables; and
- forming a mini duct substantially in the center of the optical hybrid cable,
- wherein the mini duct comprises an inner space in which the fiber-optic cable is operatively mounted.

9. The method of claim 8, further comprising:
- positioning a plurality of interposed cores such that each of the plurality of interposed cores is disposed between at least one of the plurality of power cables and the coating.

10. The method of claim 8, wherein the power cable comprises:
- the at least one conducting wire; and
- a nonconductive coating disposed around the conducting wire.

11. The method of claim 8, wherein the plurality of power cables include at least two types of power cables, and
- wherein each of the at least two types of power cables comprise built-in conducting wires that are different in diameter from the built-in conducting wires of the other types of power cables.

12. The method of claim 8, further comprising:
- forming a coating around the second binder at the outermost of the optical electrical hybrid cable.

13. The method of claim 12, further comprising:
- forming an electromagnetic shielding member disposed between the plurality of power cables and the coating.

14. The method of claim 13, further comprising:
- forming a ground member disposed between the plurality of power cables and the coating such that the ground member is in contact with the electromagnetic shielding member.

15. An optical electrical hybrid cable for transmitting an optical signal and an electrical signal simultaneously, the optical electrical hybrid cable comprising:
- a fiber-optic cable disposed in the center of the optical electrical hybrid cable, and including a plurality of tubes each of which comprises a plurality of optical fibers operatively mounted in an inner space thereof, and a first binder disposed around the plurality of tubes;
- a plurality of power cables disposed around the fiber-optic cable, each of the power cables comprising a plurality of conducting wires;
- a second binder disposed around the plurality of power cables;
- a coating disposed around the second binder and disposed in the outermost of the optical electrical hybrid cable;
- an electromagnetic shielding member disposed between the plurality of power cables and the coating, for electromagnetic shielding; and
- a ground member disposed between the plurality of power cables and the coating, so as to be in contact with the electromagnetic shielding member.

16. The optical electrical hybrid cable of claim 15, wherein the power cable comprises:
- the at least one conducting wire; and
- a nonconductive coating disposed around the conducting wire.

17. The optical electrical hybrid cable of claim 15, wherein the plurality of power cables include at least two types of power cables, and
- wherein each of the at least two types of power cables comprise built-in conducting wires that are different in diameter from the built-in conducting wires of the other types of power cables.

18. The optical electrical hybrid cable of claim 15, further comprising a mini duct which comprises an inner space in which the fiber-optic cable is operatively mounted,
- wherein the mini duct is disposed substantially in the center of the optical electrical hybrid cable.

19. The optical electrical hybrid cable of claim 15, further comprising a plurality of interposed cores each of which is disposed between at least one of the plurality of power cables and the second binder so that the optical electrical hybrid cable may maintain an original shape thereof.

* * * * *